United States Patent
Zeh et al.

(10) Patent No.: US 12,463,960 B2
(45) Date of Patent: Nov. 4, 2025

(54) SECURE COMMUNICATIONS USING PRE-GENERATED SUBKEYS

(71) Applicant: Infineon Technologies AG, Nuebiberg (DE)

(72) Inventors: Alexander Zeh, Munich (DE); Patrick Kresmer, Munich (DE); Andreas Graefe, Strassblach-Dingharting (DE)

(73) Assignee: Infineon Technologies AG, Neubiberg (DE)

( * ) Notice: Subject to any disclaimer, the term of this patent is extended or adjusted under 35 U.S.C. 154(b) by 239 days.

(21) Appl. No.: 18/069,396

(22) Filed: Dec. 21, 2022

(65) Prior Publication Data

US 2024/0214370 A1 Jun. 27, 2024

(51) Int. Cl.
*H04L 9/40* (2022.01)

(52) U.S. Cl.
CPC .................................. *H04L 63/083* (2013.01)

(58) Field of Classification Search
CPC ... H04L 63/083; H04L 9/0631; H04L 9/0861; H04L 9/40; H04L 12/40; H04L 63/0435; H04L 63/06; H04L 2012/40215; H04L 2012/40273; G05B 23/0213
See application file for complete search history.

(56) References Cited

U.S. PATENT DOCUMENTS

| | | | | |
|---|---|---|---|---|
| 8,200,794 | B1 * | 6/2012 | Sutherland | H04L 63/0209 709/222 |
| 11,726,956 | B1 * | 8/2023 | Khare | G06F 8/65 707/624 |
| 2002/0138750 | A1 * | 9/2002 | Gibbs | G06F 21/71 713/193 |
| 2010/0074441 | A1 * | 3/2010 | Pauker | H04L 9/0625 713/168 |
| 2020/0044842 | A1 * | 2/2020 | Usui | H04L 9/0822 |
| 2020/0295946 | A1 * | 9/2020 | Velikevitch | H04L 9/085 |
| 2022/0376922 | A1 * | 11/2022 | Kalach | H04L 9/0643 |

OTHER PUBLICATIONS

FIPS 197, "Advanced Encryption Standard (AES), Category: Computer Security", Information Technology Laboratory, National Institute of Standards and Technology, 46 pgs., Nov. 26, 2001, https://doi.org/10.6028/NIST.FIPS. 197-upd1.

(Continued)

*Primary Examiner* — Abu S Sholeman
(74) *Attorney, Agent, or Firm* — Banner & Witcoff Ltd.

(57) ABSTRACT

The described techniques address issues associated with current secure in-vehicle communication systems, which are required to generate subkeys per each encoded data transmission/reception. These encoded data transmissions/receptions may be in accordance with several different in-vehicle communication protocols, and the requirement of such protocols to generate the subkeys "on-the-fly" may lead to significant processing overhead and latency. The embodiments provided herein address the issue of subkey generation by using a predetermined function to pre-calculate and store the subkeys that are to be used for future encoded data message transmissions/receptions. In this way, the time and overhead required to generate the subkeys may be better and more efficiently managed.

24 Claims, 12 Drawing Sheets

(56) References Cited

OTHER PUBLICATIONS

International Standard, ISO 11898-2, Road Vehicles—Controller Area Network (CAN)—Part 2: High-Speed Medium Access Unit, 12 pgs., Dec. 15, 2016.
Autostar, "Requirements on Secure Onboard Communication—Autostar CP Release 4.3.1", 18 pgs., Dec. 8, 2017.
CAN in Automations, "CAN XL", https://www.can-cia.org/can-knowledge/controller-area-network-extended-data-field-length-can-xl, Jun. 2019.
International Standard, ISO 26262, "Functional Safety", Parts 1 through 7, 368 pgs., Dec. 2018.
Gueron, S., et al., "Better Bounds for Block Cipher Modes of Operation via Nonce-Based Key Derivation", 18 pgs., 2017.
Dworkin, M., Recommendation for Block Cipher Modes of Operation: Galois/Counter Mode (GCM) and GMAC, NIST Special Publication 800-38D, 39 pgs., Nov. 2007.
IEEE Standards Association, "Local and Metropolitan Area Networks—Media Access Control (MAC) Security", IEE Computer Society, 239 pgs., 2018.

* cited by examiner

DeriveKey(K, N)

```
Context: encryption-keylength (= 128 or 256)
if encryption-keylength = 128 AES is AES128, else AES is AES256
Key: K
Input: N (96 bits)
If encryption-keylength =128 then repeats = 4, else repeats = 6
for i from 0 to repeats-1 do
    Tj = AES (K, N [95:0] || IntToString32 (i))
end
K1 = T1 [63:0] || T0 [63:0]
If keylength=128 then
    K2 = T3 [63:0] || T2 [63:0]
else
    K2 = T5 [63:0] || T4 [63:0] || T3 [63:0] || T2 [63:0]
end
Output: K1 (128 bits), K2 (128 or 256 bits)
```

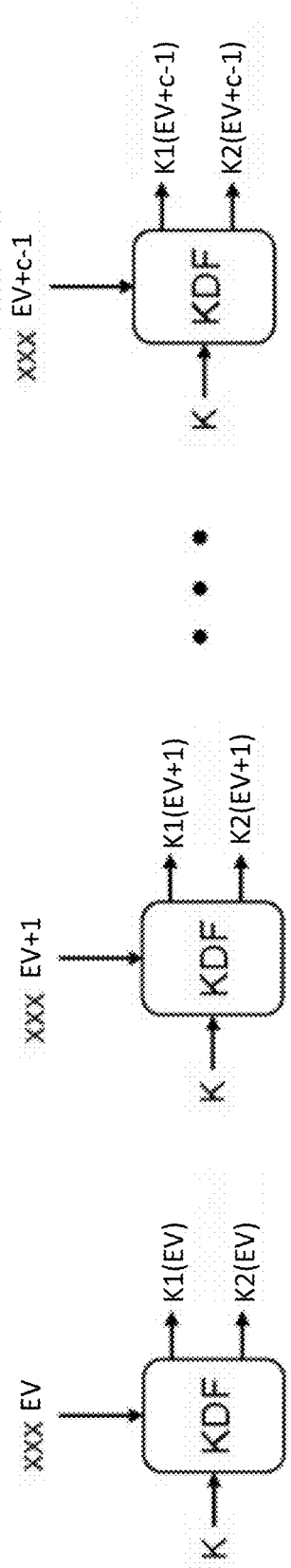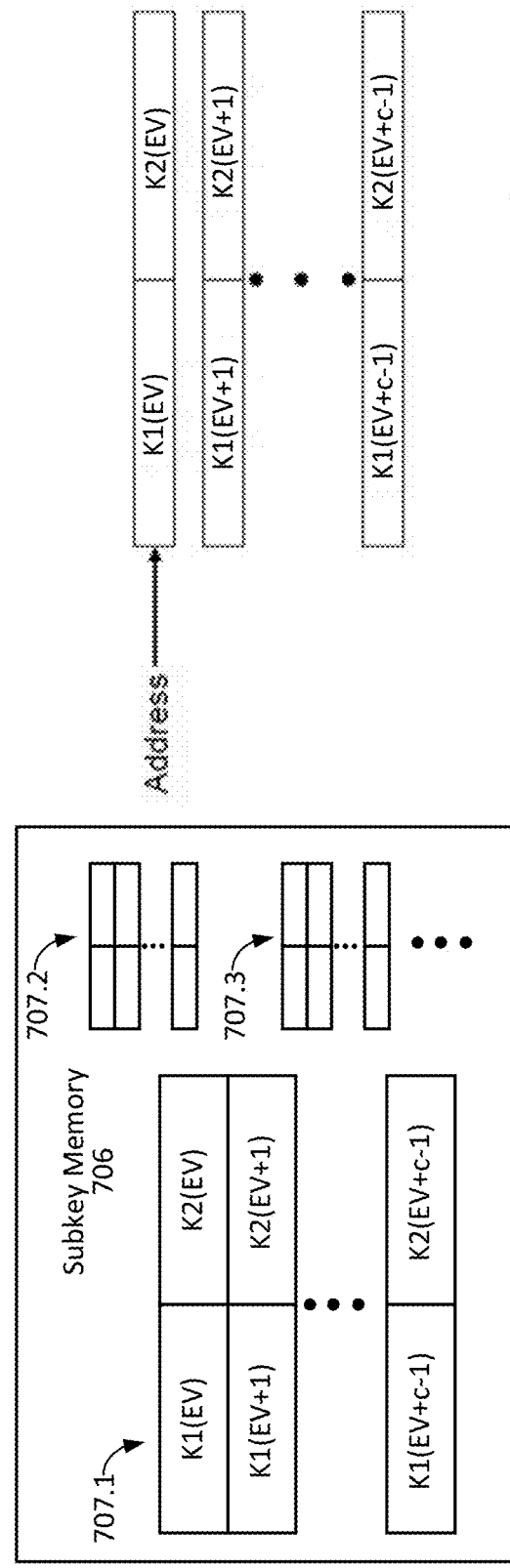

US 12,463,960 B2

SECURE COMMUNICATIONS USING PRE-GENERATED SUBKEYS

TECHNICAL FIELD

The aspects described herein generally relate to the use of secure data communications and, more particularly, to the use of a secure communications that leverage pre-generated subkeys in accordance with a key derivation function.

BACKGROUND

Controller Area Network (CAN), Controller Area Network Flexible Data-Rate (CAN FD), Controller Area Network Extra Long (CAN XL), and Ethernet communication protocols are currently the dominant network/protocols implemented for use in automotive in-vehicle communications, which leverage an accompanying electrical/electronic (E/E) architecture. However, these conventional approaches have various drawbacks, particularly with respect to the overhead required to generate subkeys on the fly as new encoded data messages need to be transmitted, received, and decoded within the in-vehicle network.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

FIG. 4B illustrates a conventional key derivation function (KDF) in accordance with the AES-GCM-SIV mode of operation to generate subkeys;

FIG. 7A illustrates an example subkey pre-calculation process, in accordance with an embodiment of the disclosure;

FIG. 7B illustrates an example subkey cache data structure, in accordance with an embodiment of the disclosure;

FIG. 7C illustrates an example address mapping of cached subkeys, in accordance with an embodiment of the disclosure;

The example aspects of the present disclosure will be described with reference to the accompanying drawings. The drawing in which an element first appears is typically indicated by the leftmost digit(s) in the corresponding reference number.

SUMMARY

Again, conventional communication protocols and E/E architectures have various drawbacks, particularly with respect to the processing power, overhead, and time required to generate the subkeys needed to ensure authentic and secure communications across the E/E network architecture. For instance, conventional security measures include an authentication only (i.e. a Message Authentication Code, or MAC) based approach, which is referred to as "Secure On Board Communication" This Secure On Board Communication process is defined by the AUTomotive Open System Architecture (AUTOSAR), which is an automotive open system architecture. The AUTOSAR Secure On Board Communication process acts on application layers, and provides a framework of software application programming interfaces (APIs) for use in an in-vehicle communication network.

However, the current multitude of possibilities for the various parameters utilized via the Secure On Board Communication process makes a fast, safe, and economic hardware implementation infeasible. The embodiments provided herein address these issues by providing a predetermined function to pre-calculate and store the subkeys that are to be used for transmitting and/or receiving encoded data messages. By generating the subkeys ahead of time in this manner, the subkeys may be generated during time periods of communication inactivity, i.e. during times when encoded data transmissions are not being sent or received. In this way, the time and overhead required to generate the subkeys may be better and more efficiently managed, as the subkeys need not be generated "on-the-fly" at the time of message transmission/reception.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

I. Technology Overview: In-Vehicle Encoded Communications

Figure 1:
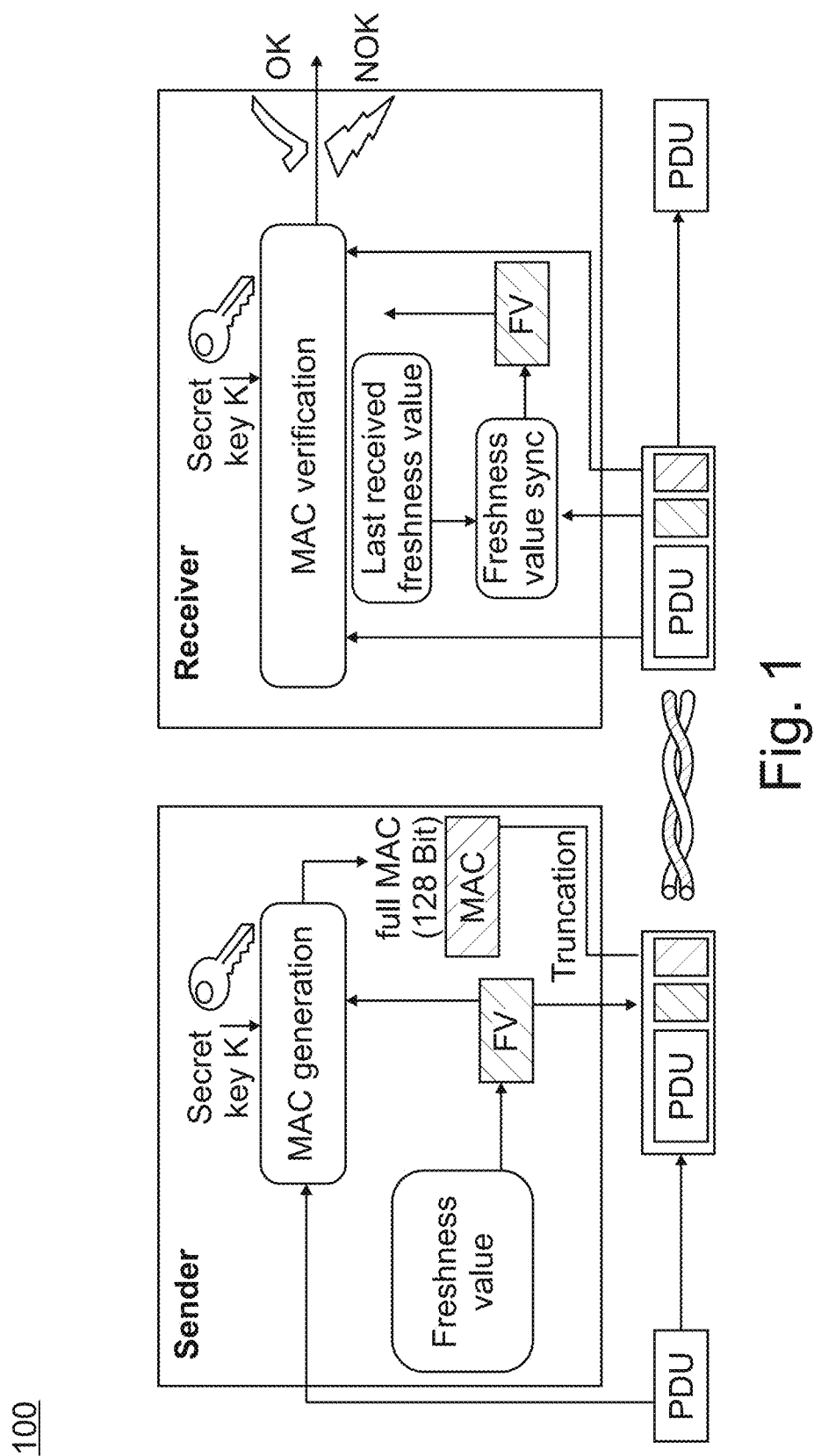
FIG. 1 illustrates a block diagram of a conventional in-vehicle network architecture for providing secure communications within a vehicle.

FIG. 1 illustrates a block diagram of a conventional in-vehicle network architecture for providing secure communications within a vehicle. Such an architecture may support any suitable number of nodes, which communicate with one another via the transmission of encoded data messages. For the example in FIG. 1, two nodes are shown, which include a sender and a receiver. Each node may be identified with an electronic control unit (ECU) of the vehicle in which it is implemented, or as any other suitable in-vehicle components. Both the sender and receiver are programmed with or otherwise have access to a secret key, which is of any suitable bit length and is typically stored in a secure memory identified with the nodes, or otherwise accessible via the sender and receiver as shown in FIG. 1. The secret key is generally static and does not change over the operational life of a node, and thus may be flashed, written to, stored, etc., as part of an initial manufacturing process.

To generate an encoded data message, the sender unit uses the secret key and a freshness value to generate a full message authentication code (MAC), which is correlated to a protocol data unit (PDU). The manner in which the full MAC message is generated in this manner is dependent upon the particular communication protocol that is implemented, the details of which are further discussed herein. The freshness value (FV) is used to enhance security measures by preventing a replay attack. To do so, the freshness value is generated as a different value, typically on a per-MAC basis, whereas the secret key is a static or unchanging value between MACs. Thus, the freshness value is used in combination with the secret key to generate a full MAC having any suitable bit length, which is shown in FIG. 1 as 128 bits. The full MAC is truncated to a smaller bit length and packaged together with the PDU and freshness value used to generate the MAC as part of a data frame, which may alternatively be referred to as a data block. The data frame is then transmitted to the receiver unit over one or more wires, data buses, interconnections, etc., in accordance with a suitable communication protocol.

The receiver unit then receives the data frame, and synchronizes the received freshness value in accordance with the last received freshness value as shown in FIG. 1. The synchronized freshness value should match the freshness value that was transmitted via the sender unit for the MAC to be verified (i.e. authenticated). The receiver unit then verifies the MAC using the PDU, freshness value, and truncated MAC and, when applicable, also decrypts the contents of the MAC.

Figure 2B:
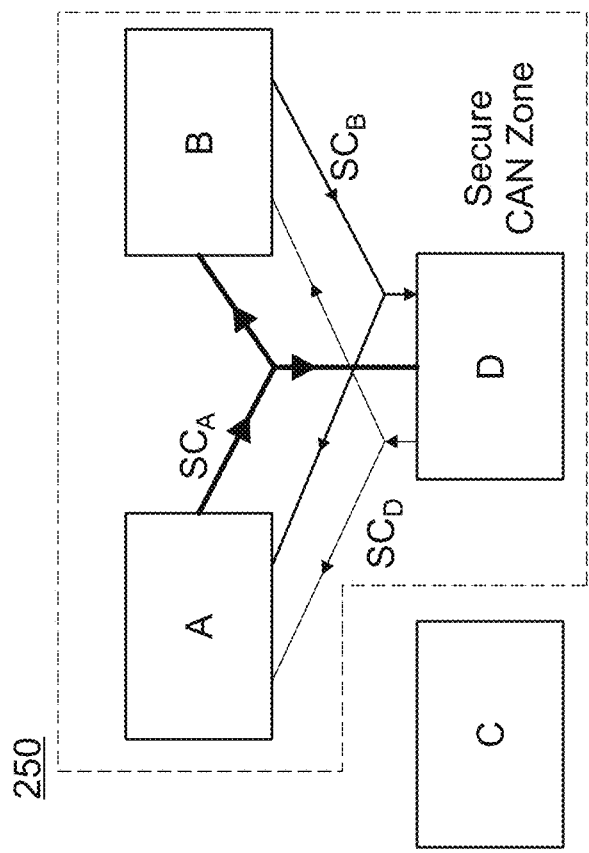
FIG. 2B illustrates a conventional CAN architecture supporting one or more secure zones and secure channels.

The communication protocols that may be implemented in accordance with the conventional in-vehicle network architecture as shown in FIG. 1 may include the Controller Area Network (CAN) communication protocol, the Controller Area Network Flexible Data-Rate (CAN FD) communication protocol, the Controller Area Network Extra Long (CAN XL) communication protocol, an Ethernet communication protocol, etc. For the CAN-XL communication protocol, the nodes as discussed with reference to FIG. 1 may comprise trusted hosts, with groups of two or more such trusted hosts forming a secure zone. Thus, illustrates a block diagram of a conventional physical Controller Area Network (CAN) architecture that comprises a set of nodes, with the CAN XL communication protocol as shown in FIG. 2B implementing a secure zone (SZ) and secure channel (SC) scheme to enhance the security of communications sent between the various nodes over the CAN network. It is noted that the communication protocols that implement secure zones in this manner may also include Ethernet-based networks in addition to CAN-based networks. Thus, although the secure zones are discussed herein in the context of CAN-based networks, the embodiments as described herein may likewise leverage CAN-based or Ethernet-based networks, but are not limited to these specific implementations and may utilize any suitable type of network architecture and/or communication protocol(s), as noted herein.

For example, the shaded portion of the CAN network 250 as shown in FIG. 2B comprises a secure CAN zone, which includes the nodes A, B, and D, and which are each configured in this case as trusted hosts. The node C may communicate with other nodes, but is not part of the secure zone as shown in FIG. 2B. It is noted that a group of two or more trusted hosts that form a secure zone may communicate securely with one another, and spans over one or more physical CAN networks may occur through secure gateways. The particular secure zone with which a trusted host A, B, D is identified may be an identifier that is included in the encoded messages transmitted between the trusted hosts within a secure zone, and thus may act as another level of authentication that is verified when received by the recipient of the encoded message.

Figure 2A:
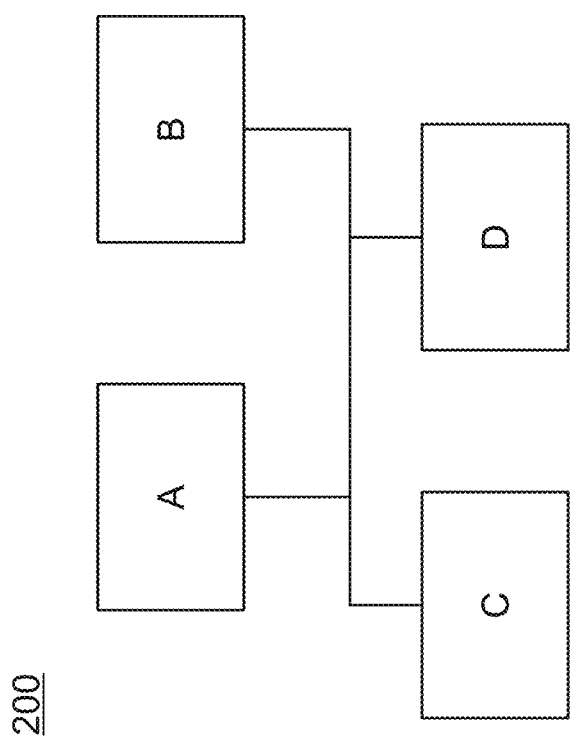
FIG. 2A illustrates a block diagram of a conventional physical Controller Area Network (CAN) architecture.

Moreover, the CAN XL communication protocol defines a protocol to enable the secure hosts within each secure zone to implement secure channels to transmit encoded data messages to one another. Each secure channel used by a trusted host within the secure zone comprises a secure transmission channel of messages for that trusted host to other trusted hosts within the same secure zone, and thus functions as a unidirectional, point-to-multipoint channel, as shown in FIG. 2B. In other words, the secure zone may be identified in accordance with a set of secure channel indicators (SCIs), which are defined by the CAN XL communication protocol. Each secure channel is identified with a respective SCI, and is unique in the physical and logical CAN network. Thus, the secure channels $SC_A$, $SC_B$, $SC_D$ as shown in FIG. 2A are each defined in accordance with a separate and unique SCI.

The CAN XL communication protocol also defines a security association (SA) between trusted hosts within each secure zone by way of a security parameter. This security parameter may be transmitted as part of the data frame as noted above with respect to FIG. 1 when transmitting encoded data messages over the secure channel, and enables recipient trusted hosts to identify each secure association (in the secure channel) for which a dedicated key is used. Each secure channel may have up to two security associations, as is the case in FIG. 2B, with each of the trusted hosts communicating with two other trusted hosts via their respective secure channels.

The embodiments as described in further detail herein may be implemented in accordance with any of the conventional network architectures and communication protocols as discussed herein, but are not limited to such implementations. In fact, additional details regarding further and alternative communication protocols, with which the embodiments described herein may operate, are also described in further detail below. Thus, for ease of explanation and to provide further clarity regarding the embodiments as disclosed herein, additional detail is provided immediately below with respect to the generation of conventional encoded data messages.

II. Technology Overview: In-Vehicle Authentication and Encryption

Figure 3A:
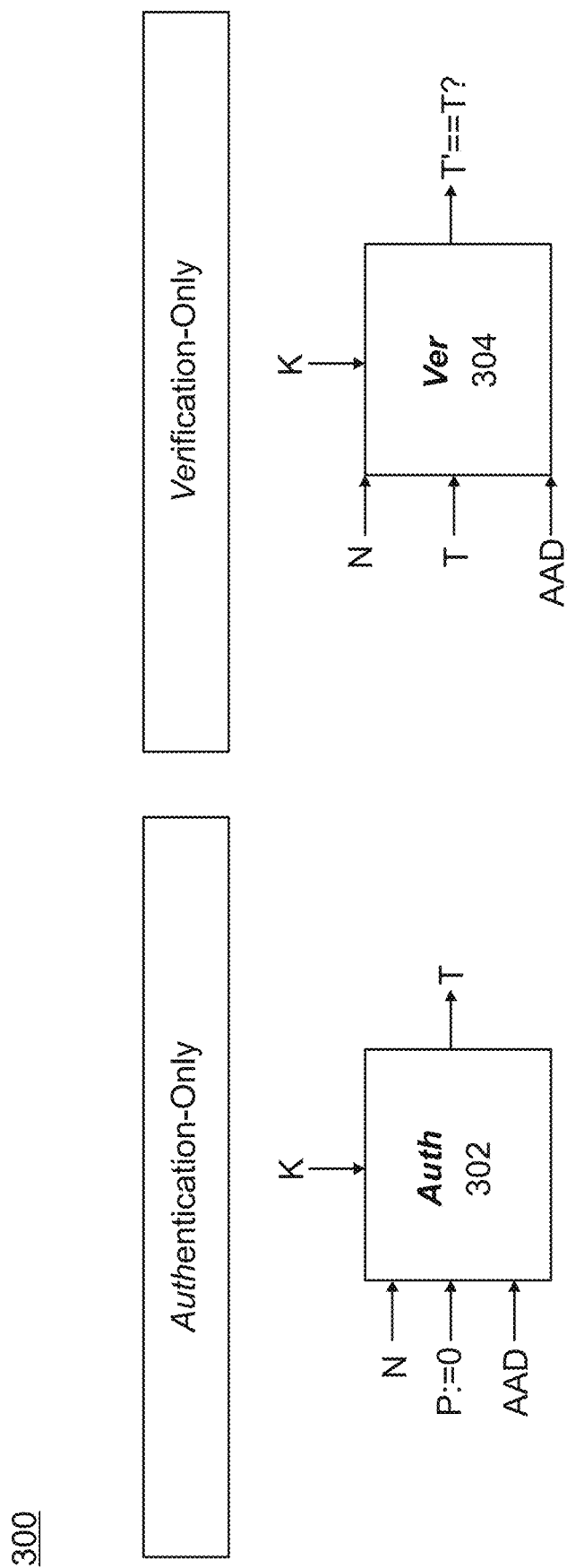
FIG. 3A illustrates conventional inputs and outputs identified with a first type of secure communications.

FIG. 3A illustrates conventional inputs and outputs identified with a first type of secure communications. For the first type of secure communications as shown in FIG. 3A, only message authentication is performed, in contrast to the additional use of encrypted ciphertext as shown and discussed in further detail below with respect to FIG. 3B. Thus, the authentication process as shown on the left in FIG. 3A is identified with the transmission of an encoded data message that is received and processed by an intended recipient to verify (i.e. authenticate) the sender of the encoded data message. Thus, the encoded data message may be transmitted by a node within the E/E architecture of the vehicle, such as the sender unit as shown in FIG. 1 for example. Thus, the authentication block 302 as shown in FIG. 3A may be identified with the MAC generation unit of the sender unit as shown in FIG. 1. Moreover, the encoded data message may be received by a node within the E/E architecture of the vehicle, such as the receiver unit as shown in FIG. 1 for example. Thus, the verification block 304 as shown in FIG. 3A may be identified with the MAC verification unit of the receiver unit as shown in FIG. 1.

In any event, the encoded data message may be transmitted and received in this manner using an authentication process in accordance with any suitable communication protocol, such as the CAN, CAN FD, and CAN XL communication protocols as discussed above. For the authentication-only process as shown in FIG. 3A, the authentication block 302 receives four inputs and provides one output. The four inputs include the secret key (k), a number used only once ("nonce," N), additional authentication data (AAD), and plaintext (P).

The nonce may be of any suitable length (such as a bit string) and represent any suitable value. The nonce value and the AAD are not encrypted, i.e. these are only authenticated, and may be persisted in clear text, or communicated unencrypted. The AAD functions to add a secondary level of security, as the AAD will be authenticated, and therefore if an attacker modifies the bits of the AAD the verification process will detect the modification. Moreover, for the authentication-only process as shown in FIG. 3A, the plaintext is not used (it is used to create the ciphertext, as discussed with respect to FIG. 3B), and thus the notation P:=0 is shown in FIG. 3A to indicate that the plaintext value is not utilized.

The authentication block 302 then uses the secret key and the nonce value to generate the authentication tag. Thus, in the authentication-only scenario, the authentication tag T is an encoded data message that is truncated from the full bit length MAC and appended to the original message that is generated by the sender unit. The verification block 304 likewise receives four inputs, three being the same as those received by the sender unit (i.e. the nonce value N, the AAD, and the secret key k). The verification block 304 generates another tag T' in the same manner as the authentication block 302, and also receives the tag T that is transmitted by the authentication block 302. The verification block 304 may thus authenticate the encoded data message by verifying that the locally-generated tag T' matches the tag T transmitted by the authentication block 302. The verification block 304 outputs an authentication indicator "T'==T" as shown in FIG. 3A, which may be a binary value (e.g. logical 0 or 1) or other suitable representation of the outcome of the authentication determination.

Figure 3B:
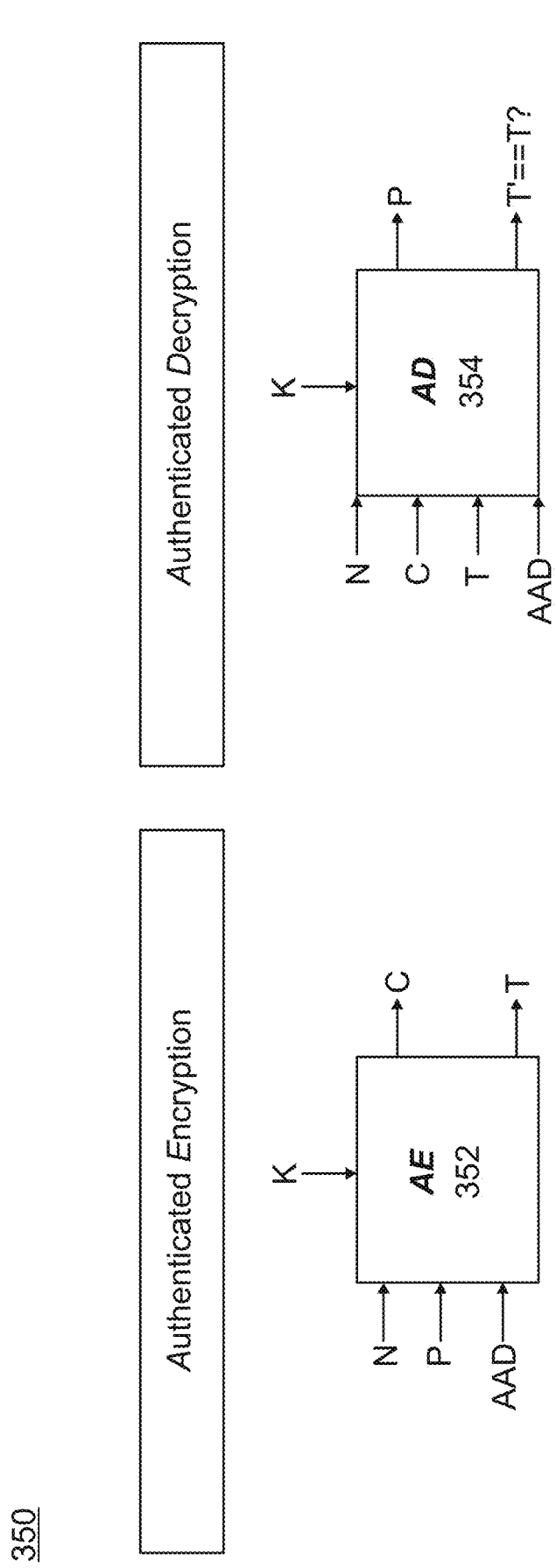
FIG. 3B illustrates conventional inputs and outputs identified with a second type of secure communications.

Turning now to FIG. 3B, the encoded data message in this case comprises both the ciphertext C and the authentication tag T. Thus, the authenticated encryption block 352 as shown in FIG. 3B may also be identified with the MAC generation unit of the sender unit as shown in FIG. 1, whereas the authenticated decryption block 354 may be identified with the MAC verification unit of the receiver unit. The authenticated encryption block 352 and the authenticated decryption block 354 may function in the same manner as the authentication block 302 and verification block 304, respectively, as shown and discussed above with reference to FIG. 3A.

However, for the scenario as shown in FIG. 3B, the encoded data message (i.e. the full MAC as shown in FIG. 1) comprises ciphertext in addition to the authentication tag. The scenario as shown in FIG. 3B may be referred to as an authenticated encryption with associated data (AEAD) communications. Thus, the plaintext P in this case is used to generate the cyphertext C using the secret key and the nonce value, which is then transmitted by the authenticated encryption block 352 as an additional output compared to the authentication block 302. The authenticated decryption block 354 receives the same inputs as the verification block 304, and additionally receives the ciphertext C. Thus, in addition to the authentication indicator, the authenticated decryption block 354 uses the secret key and the nonce value to decrypt the ciphertext C, with the decrypted result being output as the original plaintext P that was encrypted by the authenticated encryption block 352.

Figure 4A:
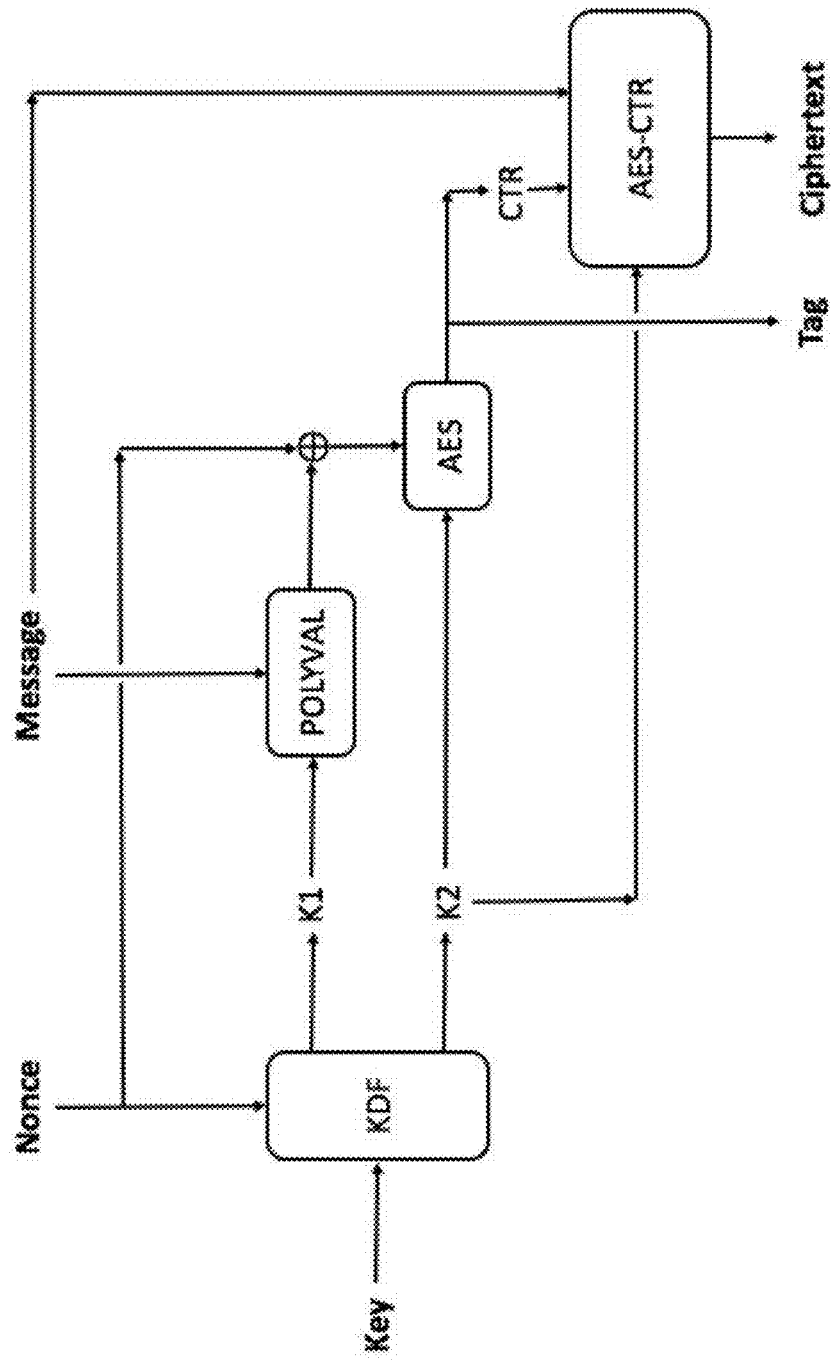
FIG. 4A illustrates a conventional architecture for transmitting encoded data messages using an authenticated-encryption Galois/Counter Mode (AES-GCM)-SIV mode of operation.

III. Additional Details of Authenticated Encryption with Associated Data (AEAD) Modes of Operation The AEAD mode of operation as discussed above with reference to FIG. 3B may be implemented in accordance with communication protocols such as the CAN, CAN FD, and CAN XL protocols as noted above. For ease of explanation, the embodiments are discussed in further detail herein with respect to the authenticated-encryption Galois/Counter Mode (AES-GCM)-SIV mode of operation, a conventional implementation of which is shown in FIG. 4A, which forms part of the CAN XL communication protocol. However, the embodiments as discussed herein are not limited to any specific communication protocol and/or mode of operation, and may be implemented in accordance with any suitable platform, architecture, communication protocol, mode of operation, application, etc., which utilizes a key derivation function (KDF) as part of its operation. For example, such additional communication protocols may include the authenticated-encryption Galois/Counter Mode (AES-GCM)-SIV as well as the Counter with CBC-MAC Modes (CCM) of operation, communication protocols that utilize modes of operation implementing the ShangMi 4 (SM4) cipher, an Ethernet communication protocols, any suitable in-vehicle network protocols, (e.g. in-vehicle networks such as 10 BaseT-1s), any suitable communication protocols that implement an AEAD mode of operation, etc.

For instance, and turning now to FIG. 4A, a conventional authenticated-encryption Galois/Counter Mode (AES-GCM)-SIV mode of operation is shown, which may be utilized by the sender unit as shown in FIG. 1 to generate and transmit encoded data messages. Thus, the AES-GCM-SIV mode of operation utilizes three inputs, with the AAD when used being e.g. included as part of the message as shown in FIG. 4A. Thus, the AAD is not used for the generation of the subkeys, but is used for the generation of the authentication tag T, as shown in further detail in FIG. 4C.

The message as shown in FIG. 4A may correspond to the plaintext when ciphertext is being transmitted as part of an encoded data message that includes both ciphertext C and the authentication tag T. Alternatively, the plaintext may be a static or unused value when the sender unit is operating in accordance with the authentication only mode of operation as discussed above with reference to FIG. 3A, and in such a case the encoded data message comprises only the authentication tag T.

Figure 4C:
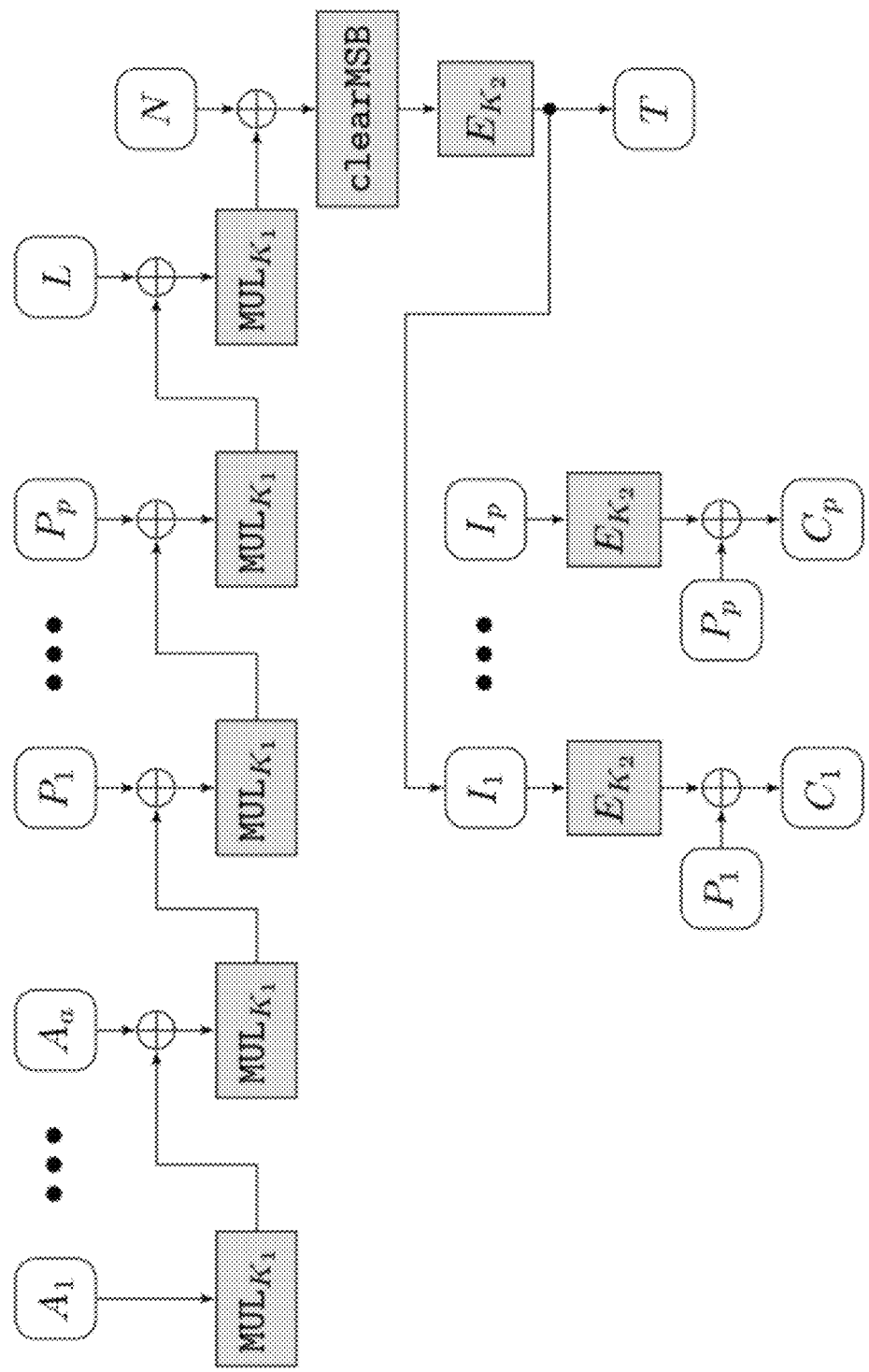
FIG. 4C illustrates the conventional use of subkeys in accordance with the AES-GCM-SIV mode of operation to generate encoded data messages.

The AES-GCM-SIV mode of operation functions in accordance with a key derivation function (KDF), which receives the secret key and nonce value, which are used to generate the subkeys K1, K2. The subkeys K1 and K2 are utilized to provide further encryption, with the subkey K1 being used in accordance with a polynomial evaluation hash function referred to as POLYVAL, and the subkey K2 being used as part of a symmetric block cipher in accordance with the Advanced Encryption Standard (AES). The AES algorithm outputs the authentication tag and a counter (CTR) value, which is used in conjunction with the subkey K1 acting as a cipher by the AES in CTR (counter) mode algorithm (AES-CTR) to output the ciphertext. Thus, the AES-GCM-SIV mode of operation utilizes the two subkeys K1, K2, which are generated for each encoded data message. Additional details regarding the use of the generated subkeys in accordance with the AES-GCM-SIV mode of operation are shown in FIG. 4C. In any event, the encoded data messages generated by the AES-GCM-SIV mode of operation may include the authentication tag T (when operating in an authentication only mode), or a combination of the authentication tag T and the ciphertext (when operating in an AEAD mode).

Thus, the AES-GCM-SIV mode of operation requires the generation of the subkeys K1, K2 for each encoded data message transmission, as well as for decoding the encoding data messages once received. These subkeys are generated in accordance with the KDF as shown in FIG. 4A. An example code snippet regarding how the KDF uses the secret key and nonce value to generate the subkeys is shown in FIG. 4B. As can be seen from FIG. 4B, for a secret key having a length of 128 bits, four AES calls are implemented, whereas for a secret key length of 256 bits, 6 AES calls are required. These AES calls are known components of the AES algorithm, and thus additional detail in this regard is not provided herein.

In any event, for the AES-GCM-SIV mode of operation, a drawback of the conventional use of the AES-GCM-SIV mode of operation is that for each nonce (that is provided for each new message to be encoded and transmitted, as well as upon being received and decoded), new subkeys K1 and K2 need to be generated out of the secret key using the KDF. The execution of the KDF may require significant processing overhead, and thus generating these new subkeys as each new encoded data message needs to be transmitted and received may result in an inefficient use of resources and increase system latency. This is particularly the case for short CAN messages, as the need to generate the subkeys K1, K2 causes a non-negligible overhead in terms of latency (especially for automotive in-vehicle real time data traffic).

IV. An Example ECU Implementation

Figure 5:
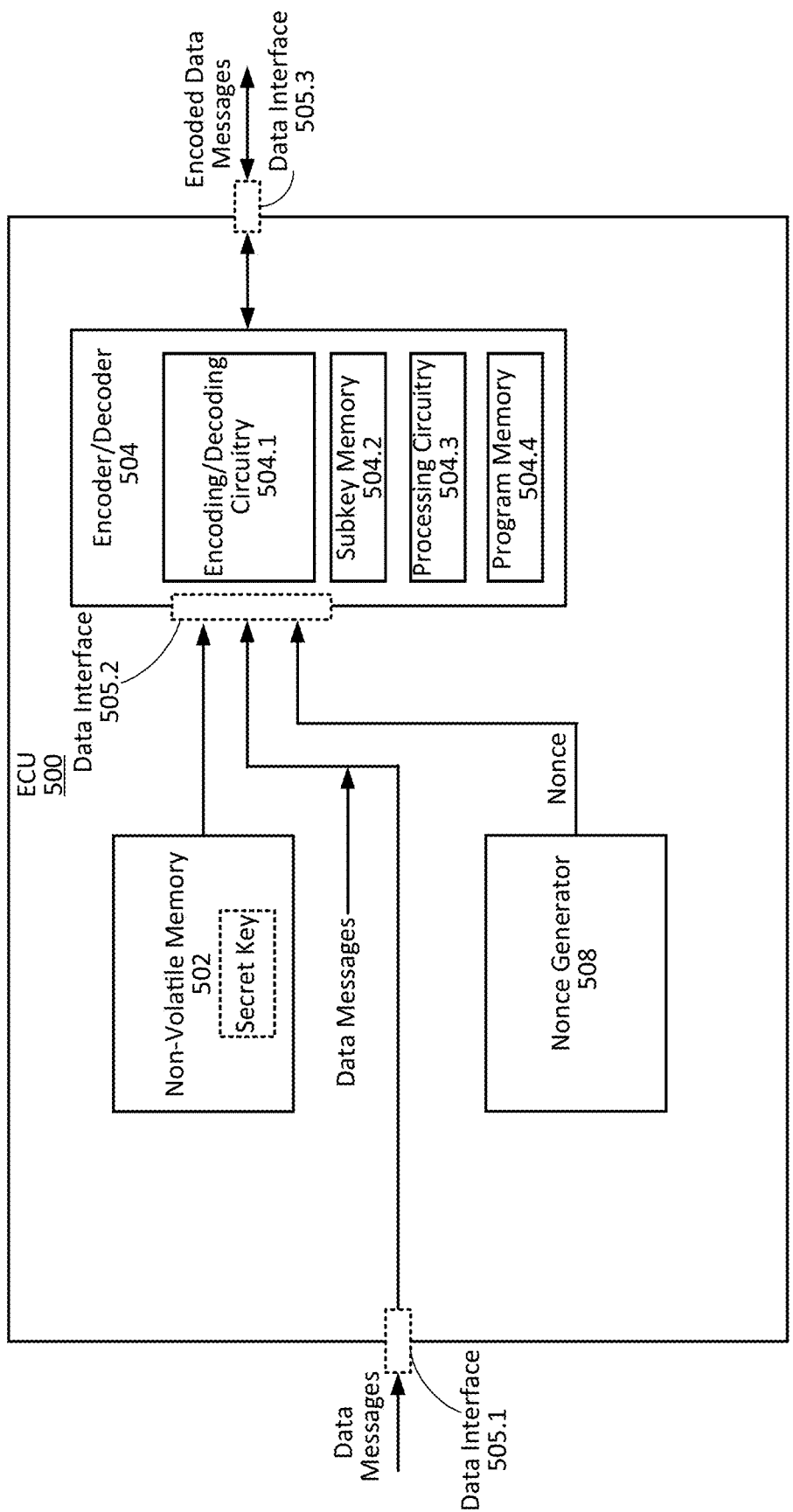
FIG. 5 illustrates a block diagram of an electronic control unit (ECU), in accordance with an embodiment of the disclosure.

FIG. 5 illustrates a block diagram of an electronic control unit (ECU), in accordance with an embodiment of the disclosure. The ECU 500 as shown in FIG. 5 may be identified with any suitable type of ECU that may be implemented as part of a vehicle. The ECU 500 may comprise a node and/or host implemented as part of an in-vehicle E/E architecture as discussed herein, and which may communicate with other ECUs, hosts, nodes, etc. within the vehicle using any suitable number and/or type of communication protocols and accompanying modes of operation. For instance, the ECU 500 may be configured to receive data messages and to transmit encoded data messages in accordance with the CAN, CAN FD, CAN XL, an AES-GCM-SIV mode of operation, a CCM mode of operation, communication protocols that utilize modes of operation implementing the SM4 cipher, an Ethernet communication protocol, etc., as discussed above. Thus, the ECU 500 may be configured to operate in a similar manner as the sender unit and the receiver unit as shown and discussed herein with reference to FIG. 1. However, and as further discussed below, the ECU 500 may advantageously leverage the use of pre-generated subkeys when transmitting and receiving encoded data messages.

To do so, the ECU 500 comprises a non-volatile memory (NVM) 502 that is configured to store a secret key used for the generation of the subkeys. Thus, the NVM 502 may be implemented as any suitable type of non-volatile memory having any suitable size for storing a secret key value, which may represent a predetermined bit string or other suitable encoded numeric value. The secret key may be written to the NVM 502 as part of a production line process during the manufacturing of the ECU 500. Alternatively, the secret key may be written to the NVM 502 via the ECU 500 or other suitable device. The NVM 502 is shown and described herein as storing a single secret key value, although this is by way of example and not limitation, as the NVM 502 may store any suitable number of secret keys, in various embodiments. Alternatively, the secret key may be stored in a different location external to the ECU 500 and communicated to the ECU 500 (not shown). In any event, the secret key(s) is/are known by the ECU 500, which are then used to facilitate the generation of subkeys and the secure transmission/reception of the encoded data messages, as further discussed herein. Therefore, the secret key(s) may be accessed or otherwise known to the ECU 500, but unknown to external devices.

The ECU 500 also comprises any suitable number N of data interfaces 505.1-505.N. Although three data interfaces 505.1, 505.2, 505.3 are shown in FIG. 5, the ECU 500 may comprise any suitable number and/or type of data interfaces to facilitate the exchange of data between the components of the ECU 500, as well as the receipt of data by the ECU 500 and the transmission of data by the ECU 500. For instance, the ECU 500 as shown in FIG. 5 comprises a data interface 505.1 configured enable the ECU 500 to receive data messages, and a data interface 506.3 configured to enable the ECU 500 to transmit and/or receive encoded data messages.

The ECU 500 also comprises a data interface 505.2 configured to enable the internal components of the ECU 500 to exchange data between one another. Thus, the various data interfaces 505 may represent any suitable number of data interfaces, each further comprising any suitable number and/or type of wires, buses, and/or respective terminals, ports, pins, etc., to enable communications between the ECU 500 and other components of a vehicle E/E architecture, internal components of the ECU 500, etc., in accordance with any suitable number and/or type of communication protocols. The embodiments herein describe wired communication interfaces, although this is by way of example and not limitation, and it will be appreciated that the concepts described herein are likewise applicable to a wireless communication. Moreover, the data interfaces 505 are shown by way of example and not limitation, and the ECU 500 may comprise additional, fewer, or alternate data interfaces, and/or may receive additional, fewer, or alternate type of data. For example, the ECU 500 may receive additional authentication data (AAD) via a separate data interface and/or via a data interface not shown in FIG. 5, which may be used in accordance with any suitable communication protocols as discussed herein.

As shown in FIG. 5, the data messages used to generate encoded data messages may be received from sources external to the ECU 500 via the data interface 505.1 Alternatively, the data messages may be generated locally at the ECU 500 in accordance with the particular communication protocol that is implemented. Thus, the data interface 505.1 is optional. Thus, although the data messages may be described herein in terms of being "received" when used to generate a respectively-encoded data message, it will be understood that data messages may be received in the context of being an input to the relevant components of the ECU 500 (e.g. via the encoder/decoder 504) and may be locally generated within the ECU 500 or received via an external source, as noted above.

The data messages received or generated by the ECU 500 may comprise plaintext when both an authentication tag and a ciphertext are to be generated as a respective encoded data message. Otherwise, the plaintext may be a null or static value, and in such a case the encoded data message may correspond to only the authentication tag, as noted above. In any event, the ECU 500 is configured to generate, for each received data message, a corresponding encoded data message that is then transmitted, as shown in FIG. 5. As further discussed herein, the data received in each data message is used to perform data encoding, which may be performed in accordance with any of the conventional techniques discussed herein, such as those used in accordance with any of the communication protocols implemented via the ECU 500. The generation of the data messages in accordance with the various communication protocols as discussed herein is defined in accordance with each respective communication standard via known processes, and thus additional details regarding the generation and content of the data messages is not further provided herein for purposes of brevity.

To perform the data message encoding and the decoding of received encoded data messages, the ECU 500 may also comprise a nonce generator 508, which is configured to generate a number used only once (nonce) value for each encoded data message to be transmitted. Thus, over time the ECU 500 may sequentially receive a number of data messages, the data of each message being used to generate respectively encoded data messages that are transmitted by the ECU 500.

Thus, for each data message received in this manner, the nonce generator 508 is configured to generate (or the ECU 500 otherwise receives) a new unique nonce value, which is used by the encoder/decoder 504 to perform data message encoding. Likewise, the nonce generator 508 is configured to generate a new unique nonce value upon receiving a transmitted encoded data message from another node, which is used by the encoder/decoder 504 to perform decoding of the encoded data message. Thus, the encoding process may include the encoder/decoder 504 generating an encoded data message that includes an authentication tag (and optionally includes ciphertext), whereas the decoding process decodes the encoded data message to verify the tag (and optionally decrypt the ciphertext to obtain the plaintext), as noted above.

To do so, the nonce generator 508 may comprise any suitable number and/or type of hardware components, hardware circuitry, software, or combinations of these. The nonce generator 508 may alternatively form part of the encoder/decoder 504, or may not be included as part of the ECU 500. For instance, the functionality provided by the nonce generator 508 may be provided by a component that is external to the ECU 500, with the nonce values being received by a respective data interface 505 identified with the ECU 500 (e.g. via the data interface 505.1).

Figure 6:
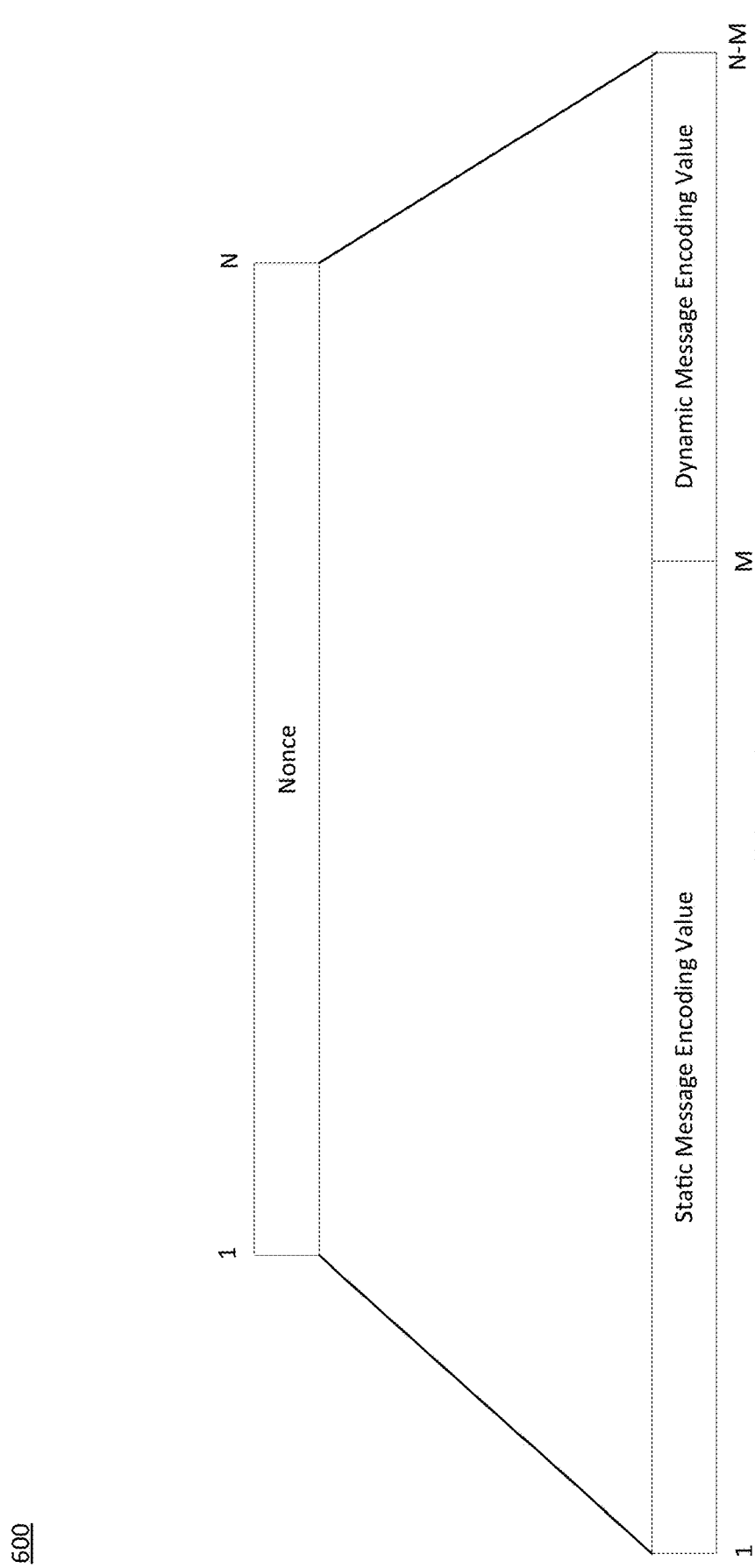
FIG. 6 illustrates an example bit structure of a number used only once (nonce), in accordance with an embodiment of the disclosure.

The nonce value may comprise any suitable number of bits, and may be any suitable type of number that is unique for each encoded data message that is to be transmitted by the ECU 500. The nonce value may also comprise any suitable number of portions, with one example of such a portioned nonce bit structure being shown in FIG. 6. With reference to FIG. 6, the nonce value has a bit length of N bits, and comprises two different portions: a static message encoding value and a dynamic message encoding value. The number of portions, as well as the data constituting each of these portions, is a function of the particular communication protocol implemented via the ECU 500.

For example, the static message encoding value may comprise the aforementioned secure channel indicator (SCI), which may be used when the encoded data message is generated as part of a CANsec Secured CAN XL frame, and which indicates the particular secure zone to which the ECU 500 belongs. Alternatively, the static message encoding value may represent any suitable type of static value that may not necessarily change over successive encoded data transmissions. Although the static message encoding value may change over certain encoded data transmissions, the term static is used in this context as this value typically remains unchanged, as this portion of the nonce typically facilitates other security-based and/or identification-based communication functions.

In contrast, the dynamic message encoding value may comprise any suitable number of bits that are unique per each generated encoded data message. Thus, the dynamic message encoding value may alternatively be referred to herein as a per message encoding value. The dynamic message encoding value may be configurable and be generated in accordance with a predetermined function, which may be generated in accordance with the particular communication protocol implemented by the ECU 500. For instance, and with reference to FIG. 6, the dynamic message encoding value may comprise the freshness value (FV) as noted above, which may be generated in accordance with any suitable communication protocols that utilize freshness values such as e.g. CAN, CAN FD, CAN XL, the AES-GCM-SIV mode of operation, etc. Thus, and as an illustrative example, the nonce value as shown in FIG. 6 may comprise a 64 bit SCI as the static message encoding value and a 32 bit FV as the dynamic message encoding value. Of course, in other embodiments alternative bit lengths, as well as the allocation of portions of bits within the nonce value, may be implemented.

The ECU 500 further comprises an encoder/decoder 504. It is noted that the ECU 500 may operate solely as a sender unit (e.g. a transmitting node) to generate and transmit encoded data messages, solely as a receiver unit (e.g. a receiving node) to receive and decode encoded data messages, or as a combination of both a sender unit and a receiver unit. For example, the encoder/decoder 504 may be identified with a modified MAC generation unit of the sender unit as shown in FIG. 1 and/or a modified MAC verification unit of the receiver unit as shown in FIG. 1.

Thus, the ECU 500 is shown and discussed herein with respect to performing the functions of both data message encoding and data message decoding, although it will be understood that the ECU 500 may comprise separate components to perform each respective function (e.g. an encoder and a decoder) or alternatively comprise a combination of such components to selectively implement both functions independently of one another. Thus, the encoder/decoder 504 may represent an encoder, a decoder, or a combination of both an encoder and decoder to facilitate the ECU operating in accordance with any of these aforementioned modes of operation.

The encoder/decoder 504 may comprise any suitable number and/or type of hardware components, hardware circuitry, software, or combinations of these. For instance, the encoder/decoder 504 may be configured in accordance with a hardware implementation via the use of the encoder/decoder circuitry 504.1, which may comprise any suitable number and/or type of dedicated hardware components such as a microcontroller, an application specific integrated circuit, a field programmable gate array (FPGA), a system on a chip (SoC), dedicated logic and/or other circuitry, etc.

The encoder/decoder 504 may additionally or alternatively comprise processing circuitry 504.3, which may be implemented as one or more processors, cores, and/or processing circuitry, and which may execute computer-readable instructions stored in the program memory 504.4 to perform the various functions as discussed in further detail herein. The program memory 504.4 may comprise any suitable type of non-transitory computer readable medium such as volatile memory, non-volatile memory, or combinations of these. Still further, the encoder/decoder 504 may be implemented as a combination of hardware and software, with the encoder/decoder circuitry 504.1, the processing circuitry 504.3, and the program memory 504.4 sharing different portions of the functionality performed by the encoder/decoder 504.

In any event, the encoder/decoder 504 comprises a subkey memory 504.2, which may comprise any suitable type of non-transitory computer readable medium such as volatile memory, a non-volatile memory, or combinations of these. The subkey memory 504.2 may comprise a cache that is included as part of the encoder/decoder circuitry 504.1, the processing circuitry 504.3, and/or the program memory 504.4, or may be a separate component as shown in FIG. 5. The subkey memory 504.2 may be of any suitable size depending upon the number of pre-generated subkeys that are to be stored at a particular time. Moreover, the subkey memory 504.2 may be partitioned or otherwise organized in accordance with any suitable type of addressable space.

Again, the ECU 500 may be implemented in accordance with vehicle E/E architectures that utilize subkeys to generate the encoded data messages and to decode the encoded data messages, as noted above. Thus, in accordance with an embodiment, the encoder/decoder 504 is configured to generate and store a plurality of subkey sets K1, K2 in accordance with a key derivation function (KDF). The generation and storage of these subkey sets occurs prior to the receipt of data messages, which are subsequently encoded and transmitted. Furthermore, the generation and storage of the subkey sets occurs prior to the receipt of encoded data messages, which are subsequently received and decoded. Thus, the embodiments described herein advantageously pre-generate and store subkeys to be used for encoding future encoded data message transmissions and/or for decoding future encoded data message receptions, thereby saving processing overhead and addressing the latency issues as noted above. The KDF used to generate the subkeys may be one defined in accordance with a conventional communication protocol, such as the Galois/Counter Mode (AES-GCM)-SIV mode of operation as noted above and shown in FIG. 4B, but is not limited to this particular implementation. Instead, the encoder/decoder 504 may be implemented as part of any suitable type of encoded data message generation scheme that generates and utilizes subkeys in accordance with a predefined KDF.

To generate the subkey sets, which are then stored in the subkey memory 504.2, the encoder/decoder 504 utilizes, as inputs for each one of the generated plurality of subkey sets, the secret key and a predetermined encoding value. This predetermined encoding value may correspond to the same type of encoding value as the dynamic message encoding value forming a portion of the nonce value as noted above. Thus, the subkey sets that are generated and stored in the subkey memory 504.2 may be later used to generate encoded data messages and/or to decode encoded data messages. To do so, the subkeys used for the data message encoding and/or decoding may correspond to the stored subkey set that was generated with the predetermined encoding value that matches the dynamic message encoding value contained in the unique nonce value that is generated at that future time (i.e. when the encoded data message is transmitted or received).

Thus, the encoder/decoder 504 requires information regarding the manner in which each dynamic message encoding value is computed for each uniquely generated nonce value. This information may be determined by way of the particular communication protocol that is implemented and/or the manner in which the dynamic message encoding value is modified between successively-generated nonce values. For instance, the dynamic message encoding value may be offset between each successive nonce value generation in accordance with any suitable type of predetermined function, which results in each successively generated nonce value to comprise a dynamic message encoding value having a predetermined offset value with respect to one another. Such predetermined offset values may form any suitable type of predictable and known patterns, which may be replicated by way of the predetermined encoding values used by the encoder/decoder 504.

For instance, and turning now to FIGS. 7A-7C, it is noted that the freshness value is typically generated in a counter-based manner, i.e. the predetermined function used to generate the freshness value is in accordance with a counter-based incrementation. Thus, the predetermined function used to generate the predetermined encoding values may match the predetermined function used to generate the freshness values, which may comprise a counter-based incrementation (e.g. by one, two, three, etc. per each newly generated freshness value) when the freshness values are generated in this manner. Thus, for embodiments in which the dynamic message encoding value comprises the freshness value, for each data message to be encoded and/or decoded, the nonce value comprises a new freshness value that is offset from the previous one in accordance with the predetermined offset value. This offset value may be one, for instance, in which case each new freshness value is incremented by one from the previously-generated freshness value that forms part of the nonce value. The encoder/decoder 504 is configured to exploit the knowledge of such a predetermined function (e.g. the counter-based freshness value) by pre-generating the subkey sets K1, K2 in accordance with the same offset pattern that is used when the data messages are later generated, encoded, transmitted, received, decoded, etc.

For instance, FIG. 7A shows an example of the encoder/decoder 504 generating a set of subkeys K1, K2 using a KDF having an input of the secret key (K) and a predetermined message encoding value (EV). Again, the predetermined message encoding values may be generated to match the offset and pattern of the dynamic message encoding value, as noted above, and may comprise the freshness value in some embodiments. Therefore, for the first computation of subkeys, an initial predetermined message encoding value EV is shown, which may constitute a starting dynamic message encoding value (e.g. a starting freshness value) that may be known in advance by the encoder/decoder 504 based upon a previous encoded data transmission/reception, or from an initial freshness value used or defined upon initialization, for instance.

In any event, the encoder/decoder 504 is configured to generate any suitable number of such subkey sets K1, K2 using different predetermined message encoding values, each of the predetermined message encoding values being offset from one another in accordance with a predetermined offset value. This predetermined offset value matches that used to generate the dynamic message encoding value for each nonce, although the nonce values have not yet been received by the ECU 500 at the time of the subkey set generation.

For the example shown in FIG. 7A, it is assumed that the offset between the generated subkey sets is 1, as this is commonly used for counter-based freshness value generation. However, and as noted above, the embodiments include the ECU 500 utilizing any suitable offset value in accordance with a corresponding predetermined function based upon the knowledge of the offset pattern used to generate successive dynamic message encoding values. Thus, the encoder/decoder 504 may generate any suitable number of subkey sets K1(EV), K2(EV) up to the subkey sets K1(EV+c−1), K2(EV+c−1) as shown in FIG. 7A, each being offset from one another by a predetermined offset value (e.g. 1 as shown in FIGS. 7A-7C). Therefore, when the dynamic message encoding value is counter-based (such as the FV), the predetermined offset value comprises an offset that is generated via a predetermined function that outputs the same counter value used for the generation of each new dynamic message encoding value.

The encoder 504 may then store the subkey sets generated in this manner in the subkey memory 504.2. For ease of explanation, the subkey memory 706 as shown in FIG. 7B may be identified with the subkey memory 504.2 as shown in FIG. 5. As shown in FIG. 7B for the subkey sets 707.1, each subkey set K1, K2 may be stored at an address location in memory that is correlated with, indexed to, or otherwise referenced by the same predetermined message encoding values used by the encoder 504 to generate each respective subkey set. Thus, the number of subkey set entries stored in the subkey memory 706 is identified with the number of future dynamic message encoding values for which the subkeys may be used to encode future data messages.

Thus, at the time each data message is received, which is to be encoded and transmitted by the ECU 500, the encoder/decoder 504 (acting as an encoder/transmitter) receives the data message and corresponding nonce value as noted above, which includes a unique dynamic message encoding value for that particular data message. The encoder/decoder 504 is thus configured to generate an encoded data message for each received data message and unique nonce value using one of the stored subkey sets accessed from the subkey memory 504.2. The specific subkey set that is accessed and used for generating the encoded data message corresponds to the subkey set that was generated using a predetermined encoding value that matches the dynamic message encoding value included in the nonce for that particular encoded data messages to be generated and then transmitted.

That is, and using the operation of the encoder/decoder 504 as an encoder/transmitter, when a first encoded data message is to be transmitted, the encoder/decoder 504 receives the data message and a nonce value containing a dynamic message encoding value, as shown in FIG. 5. Then, instead of computing the subkeys using this dynamic message encoding value at this time, the encoder/decoder 504 instead selects the first set of entries of subkeys K1(EV), K2(EV) as shown in FIG. 7B, which are used to generate the encoded data message that is to be transmitted. This process is then repeated such that for each new data message and corresponding nonce value, the dynamic message encoding value included in that nonce value is used to lookup the corresponding entry of subkey sets stored in the subkey memory 504.2, which may be addressed using that matching dynamic message encoding value, as shown in FIG. 7C. In this way, the encoder/decoder 504 may compute each of the subkeys in advance to minimize or at least reduce delay due to the processing needed for the KDF.

Similarly, and using the operation of the encoder/decoder 504 as a decoder/receiver, the encoder/decoder 504 may utilize this same process of accessing (and optionally also generating in advance, as discussed above) the stored subkey sets when encoded data messages are received, which are then used for decoding the encoded data messages. The use of the stored subkey sets in this manner on the receiver side may reduce latency during the processing of received encoded data messages. For example, each time an encoded data message is received that is to be decoded by the ECU 500, the encoder/decoder 504 receives the encoded data message and corresponding nonce value as noted above, which includes the unique dynamic message encoding value for that particular encoded data message. The encoder/decoder 504 is thus configured to generate a decoded data message for each received encoded data message and unique nonce value using one of the stored subkey sets accessed from the subkey memory 504.2. The specific subkey set that is accessed and used for decoding the encoded data message corresponds to the subkey set that was generated using the predetermined encoding value that matches the dynamic message encoding value included in the nonce for the particular encoded data message that was received.

Because of the secure nature of the communications, the nonce value is unique per data message to be encoded, transmitted, received, and decoded, and should not subsequently be re-used. Thus, it is noted that the subkey memory 504.2 may be small in terms of addressable space (e.g. one or two kilobytes or less), as the sets of subkeys may be deleted upon each use by the encoder/decoder 504, and the addressable space rewritten with a new set of subkeys that have been generated using other predetermined encoding values. Thus, the encoder/decoder 504 is configured to delete each stored subkey set from those stored in the subkey memory 504.2 upon using the subkey set to generate a corresponding encoded data message. The deletion of subkeys from the subkey memory 504.2 increases security while enabling a smaller cache size. The act of deletion in this manner may be triggered, for instance, by the encoder/decoder 504 (when acting as an encoder/transmitter) after accessing the subset sets from the subkey memory 504.2, after generating the encoded data message, after transmission of the encoded data message, etc. Alternatively, the deletion may be triggered, for instance, by the encoder/decoder 504 (when acting as an decoder/receiver) after accessing the subset sets from the subkey memory 504.2, after decoding the encoded data message, etc.

Again, the encoder/decoder 504 may be configured to generate the encoded data messages and/or decoded encoded data messages using subkeys that are generated in advance.

The encoder/decoder 504 may do so in accordance with any suitable communication protocol that utilizes a defined KDF for the generation of subkeys to perform secure communications. In an embodiment, the encoder/decoder 504 is configured to generate the encoded data messages in accordance with an AES-GCM-SIV mode of operation, with an example of an encoder/transmitter embodiment being shown in FIG. 8. It is noted that the decoding process may be executed in any suitable manner including known manners, e.g. in accordance with the particular communication protocol that is implemented. This may likewise comprise encoded message decoding using the AES-GCM-SIV mode of operation. However, and as discussed above, embodiments include the subkeys being accessed from the subkey memory 504.2 as encoded data messages are received, versus the subkeys being generated as each encoded data message is received.

Figure 8:
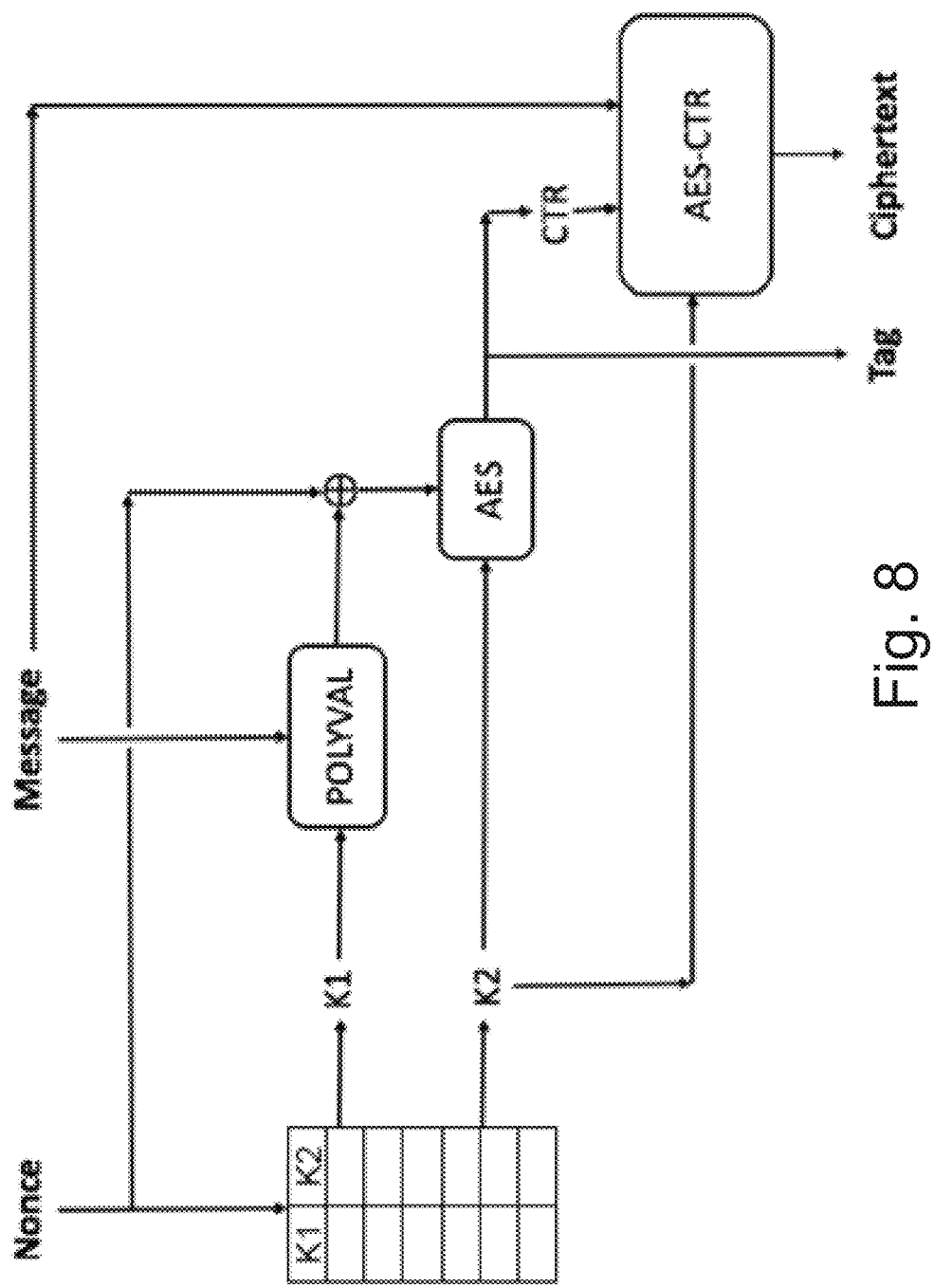
FIG. 8 illustrates an example architecture for generating encoded messages using an authenticated-encryption Galois/Counter Mode (AES-GCM)-SIV mode of operation, in accordance with an embodiment of the disclosure.

The architecture as shown in FIG. 8 is similar to that shown in FIG. 4A, which is identified with the conventional AES-GCM-SIV mode of operation and architecture for the generation and transmission of encoded data messages, as noted above. However, for the AES-GCM-SIV mode of operation as shown in FIG. 8, the stored (i.e. cached) subkeys K1, K2 are used directly upon receiving a new data message and nonce (when encoding/transmitting), as well as upon receiving an encoded data message (when decoding/receiving), without the need for performing time consuming KDF computational processing as each data message/encoded data message and nonce are received. Again, when operating as both an encoder and decoder, the encoder/decoder 504 utilizes the dynamic message encoding value included in each nonce value as new data messages are received, which may be those used to generate encoded data messages for transmission or encoded data messages that are received and to be decoded. The dynamic message encoding value is used in each case to identify the matching cached subkey sets that were generated using the KDF with a predetermined encoding value matching the dynamic message encoding value included in the nonce.

The subkey memory 706 may be configured to store any suitable number of subkey sets. For instance, FIG. 7 illustrates an example of the structure and content of a first subkey set 707.1. However, the subkey memory 706 may store any suitable number of additional subkey sets, with two additional subkey sets 707.2, 707.3 being shown as a non-limiting example and for ease of explanation. The storage of additional subkey sets in this manner may be particularly advantageous when the communication protocols used for the communication of the encoded data messages leverage multiple instances of different subkeys among the various nodes of the E/E vehicle architecture.

For example, multiple instances of subkey sets may be used to encode and decode data messages for different respective secure zones, as discussed above with respect to FIGS. 2A-2B for the CAN XL communication protocol. Although the use of different subkey sets is discussed herein with respect to an implementation for such different secure zones, this is by way of example and not limitation, and the encoder/decoder 504 may be configured to utilize the different subkey sets 707 in accordance with any suitable communication protocol and/or application. In any event, the encoder/decoder 504 is configured to generate and store any suitable number of the subkey sets in the subkey memory 504.2 in accordance with respective key derivation functions (KDFs), which may be the same KDFs or different KDFs used among the various subkey sets 707, in various embodiments.

The KDF used by the encoder/decoder 504 to generate the respective subkey sets 707.1, 707.2, 707.3, etc., may utilize, as inputs for each respectively generated subkey set 707, the secret key and a different predetermined encoding value. The different predetermined value may comprise, for example, the different freshness value or other suitable unique value that is synchronized with each respective secure zone. Thus, in such a configuration, the encoder/decoder 504 is configured to select one of the stored subkeys from among the various stored subkey sets based upon the destination node of the encoded data message that is to be transmitted or, alternatively, the originating node of the encoded data message that is received.

For example, each subkey set 707.1, 707.2, 707.3 may be allocated to a different secure zone based upon a predetermined correlation scheme that is known by the encoder/decoder 504. The encoder/decoder 504 may then identify, from the destination (e.g. address) of an encoded message to be transmitted or, alternatively, the origin (e.g. address) of an encoded data message that is received, which secure zone the destination/origin node belongs. From this information, the encoder/decoder 504 also identifies which stored subkey set 707 to reference to generate the subkeys for that particular encoded data message. The specific set of subkeys to select from a particular subkey set 707 may be determined in the same manner as noted above for the subkey set 707.1, i.e. by matching the per message encoding value contained in the received nonce for a particular data message to be encoded (or a particular encoded message to be decoded) to the predetermined encoding value used to previously generate that particular subkey set. In other words, the encoder/decoder 504 may, in some embodiments, be configured to generate each encoded data message and/or to decode each received encoded data message using the stored subkeys from any one of one of the stored subkey sets 707.1, 707.2, 707.3, etc., based upon a secure zone (or other suitable information) identified with a destination of the encoded data message to be transmitted or, alternatively, the origin of an encoded data message that is received. It is noted that the memory size occupied by each of the separate stored subkey sets 707.1, 707.2, 707.3, etc., may be different than one another, which may be selected as a function of traffic bandwidth and latency requirements per each respective secure zone.

V. An Example Process Flow

Figure 9:
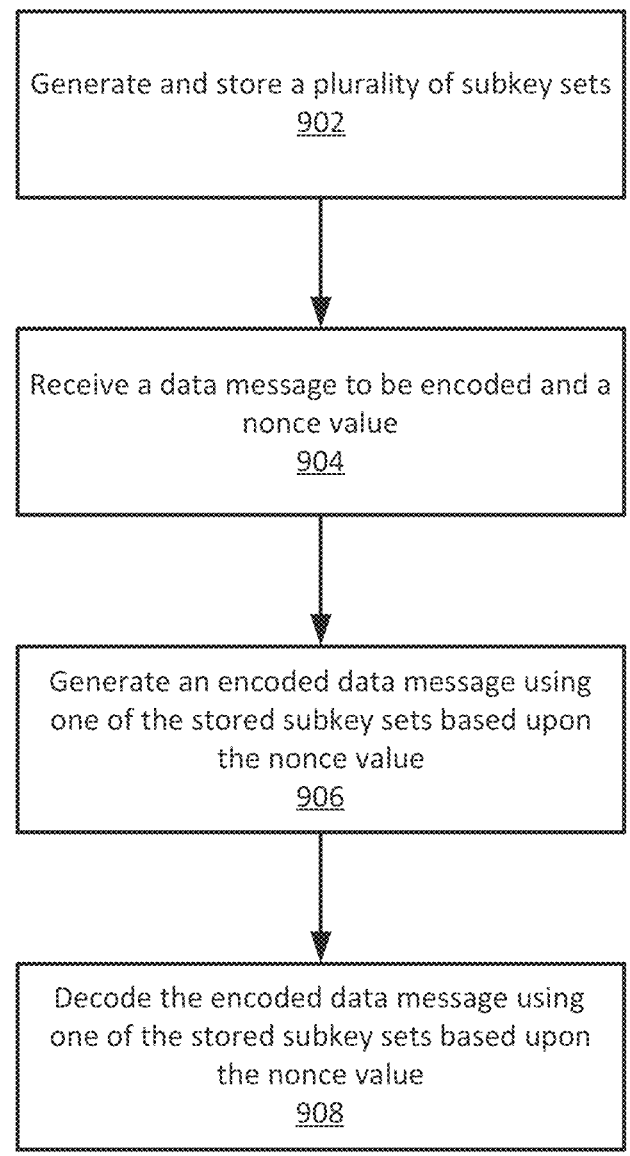
FIG. 9 illustrates an example process flow, in accordance with an embodiment of the disclosure.

FIG. 9 illustrates an example process flow, in accordance with an embodiment of the disclosure. With reference to FIG. 9, the process flow 900 may be a method executed by and/or otherwise associated with any suitable number and/or type of components such as one or more processors (processing circuitry), hardware components, executed instructions (e.g. software components) or combinations of these. The components may be associated with one or more components of the encoder/decoder 504 as discussed herein and/or one or more components of the ECU 500 as discussed herein. The flow 900 may include alternate or additional steps that are not shown in FIG. 9 for purposes of brevity, and may be performed in a different order than the steps shown in FIG. 9. Moreover, some steps may be optional. For example, only the encoding (block 906) or only the decoding (block 908) operations may be performed.

Flow 900 may begin when one or more components generating and storing (block 902) a plurality of subkey sets. This may include, for example, the encoder/decoder 504 generating and storing the subkey sets in the subkey memory 504.2 in accordance with a respective KDF, which utilizes a secret key and a predetermined encoding value, as noted above.

The flow 900 may additionally include the one or more components receiving (block 904) a data message to be encoded and a corresponding nonce value. This may include, for example, the encoder/decoder 504 receiving a data message and nonce value, as shown and discussed above with respect to FIG. 5. The nonce value may comprise a unique per-message encoding value, such as a freshness value for instance.

The flow 900 may additionally include the one or more components generating (block 906) an encoded data message using one of the stored subkey sets based upon the nonce value. This may include, for instance, selecting a subkey sets that that was generated using a predetermined encoding value that matches the per-message encoding value included in the nonce identified with the encoded data message to be transmitted, as noted herein.

The flow 900 may additionally include the one or more components decoding (block 908) an encoded data message using one of the stored subkey sets based upon the nonce value. This may include, for instance, selecting a subkey sets that that was generated using a predetermined encoding value that matches the per-message encoding value included in the nonce identified with the encoded data message that was received, as noted herein.

EXAMPLES

The techniques of this disclosure may also be described in the following examples.

Example 1. An electronic control unit (ECU) identified with a vehicle, the ECU comprising: an encoder configured to generate and store a plurality of subkey sets in accordance with a key derivation function that utilizes, as inputs for each one of the generated plurality of subkey sets, a secret key and a predetermined encoding value, wherein each one of the predetermined encoding values used to generate each respective one of plurality of subkey sets is offset with respect to one another in accordance with a predetermined offset value; and a data interface configured to receive, for each one of a plurality of encoded data messages to be transmitted in accordance with a communication protocol, a number used only once (nonce) value, a portion of the nonce value comprising a per-message encoding value, wherein the encoder is further configured to generate each one of the plurality of encoded data messages using one of the stored plurality of subkey sets that was generated using a predetermined encoding value that matches the per-message encoding value included in the nonce identified with the one of the plurality of encoded data messages to be transmitted.

Example 2. The ECU of Example 1, wherein the encoder is configured to generate the plurality of encoded data messages in accordance with an authenticated-encryption Galois/Counter Mode (AES-GCM)-SIV mode of operation or a ShangMi 4 (SM4) cipher.

Example 3. The ECU of any combination of Examples 1-2, wherein the communication protocol comprises one of a Controller Area Network (CAN) communication protocol, a Controller Area Network Flexible Data-Rate (CAN FD) communication protocol, a Controller Area Network Extra Long (CAN XL) communication protocol, or an Ethernet communication protocol.

Example 4. The ECU of any combination of Examples 1-3, wherein the plurality of subkey sets are stored in a cache at address locations identified by the predetermined encoding values used to generate each respective one of the plurality of subkey sets.

Example 5. The ECU of any combination of Examples 1-4, wherein the predetermined offset value comprises an offset generated in accordance with a predetermined function.

Example 6. The ECU of any combination of Examples 1-5, wherein the predetermined function comprises an offset generated via an incremented counter value.

Example 7. The ECU of any combination of Examples 1-6, wherein, for each one of the plurality of encoded data messages to be transmitted, the portion of the nonce value comprising the per-message encoding value comprises a freshness value.

Example 8. The ECU of any combination of Examples 1-7, wherein, for each one of the plurality of encoded data messages to be transmitted, a further portion of the nonce value comprises a secure channel indicator (SCI).

Example 9. The ECU of any combination of Examples 1-8, wherein the encoder is further configured to delete the stored subkey set from the plurality of subkey sets upon using the subkey set to generate a corresponding encoded data message.

Example 10. The ECU of any combination of Examples 1-9, wherein the encoder is further configured to generate and store a further plurality of subkey sets in accordance with a further key derivation function that utilizes, as inputs for each generated one of the further plurality of subkey sets, the secret key and a further predetermined encoding value.

Example 11. The ECU of any combination of Examples 1-10, wherein the encoder is further configured to generate each one of the plurality of encoded data messages using one of the stored plurality of subkey sets or one of the stored further plurality of subkey sets based upon a secure zone identified with a destination of the encoded data message to be transmitted.

Example 12. An electronic control unit (ECU) identified with a vehicle, the ECU comprising: a decoder configured to generate and store a plurality of subkey sets in accordance with a key derivation function that utilizes, as inputs for each one of the generated plurality of subkey sets, a secret key and a predetermined encoding value, wherein each one of the predetermined encoding values used to generate each respective one of plurality of subkey sets is offset with respect to one another in accordance with a predetermined offset value; and a data interface configured to receive, for each one of a plurality of encoded data messages to be received in accordance with a communication protocol, a number used only once (nonce) value, a portion of the nonce value comprising a per-message encoding value, wherein the decoder is further configured to decode each one of the plurality of encoded data messages using one of the stored plurality of subkey sets that was generated using a predetermined encoding value that matches the per-message encoding value included in the nonce identified with the one of the plurality of encoded data messages that is received.

Example 13. The ECU of Example 12, wherein the decoder is configured to generate the plurality of decoded data messages in accordance with an authenticated-encryption Galois/Counter Mode (AES-GCM)-SIV mode of operation or a ShangMi 4 (SM4) cipher.

Example 14. The ECU of any combination of Examples 12-13, wherein the communication protocol comprises one of a Controller Area Network (CAN) communication protocol, a Controller Area Network Flexible Data-Rate (CAN FD) communication protocol, a Controller Area Network Extra Long (CAN XL) communication protocol, or an Ethernet communication protocol.

Example 15. The ECU of any combination of Examples 12-14, wherein the plurality of subkey sets are stored in a cache at address locations identified by the predetermined encoding values used to generate each respective one of the plurality of subkey sets.

Example 16. The ECU of any combination of Examples 12-15, wherein the predetermined offset value comprises an offset generated in accordance with a predetermined function.

Example 17. The ECU of any combination of Examples 12-16, wherein the predetermined function comprises an offset generated via an incremented counter value.

Example 18. The ECU of any combination of Examples 12-17, wherein, for each one of the plurality of encoded data messages that is received, the portion of the nonce value comprising the per-message encoding value comprises a freshness value.

Example 19. The ECU of any combination of Examples 12-18, wherein, for each one of the plurality of encoded data messages that is received, a further portion of the nonce value comprises a secure channel indicator (SCI).

Example 20. The ECU of any combination of Examples 12-19, wherein the decoder is further configured to delete the stored subkey set from the plurality of subkey sets upon using the subkey set to generate a corresponding decoded data message.

Example 21. The ECU of any combination of Examples 12-20, wherein the decoder is further configured to generate and store a further plurality of subkey sets in accordance with a further key derivation function that utilizes, as inputs for each generated one of the further plurality of subkey sets, the secret key and a further predetermined encoding value.

Example 22. The ECU of any combination of Examples 12-21, wherein the decoder is further configured to generate each one of the plurality of decoded data messages using one of the stored plurality of subkey sets or one of the stored further plurality of subkey sets based upon a secure zone identified with a destination of the encoded data message that is received.

CONCLUSION

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation data. The term "information" may in addition to any form of digital information also include other forms of representing information. The term "entity" or "unit" may in embodiments include any device, apparatus circuits, hardware, software, firmware, chips, or other semiconductors as well as logical units or physical implementations of protocol layers etc. Furthermore, the terms "coupled" or "connected" may be interpreted in a broad sense not only covering direct but also indirect coupling.

It is further to be noted that methods disclosed in the specification or in the claims may be implemented by a device having means for performing each of the respective steps of these methods.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. An electronic control unit (ECU) identified with a vehicle, the ECU comprising:
    processing circuitry configured to generate and store a plurality of subkey sets in accordance with a key derivation function that (i) utilizes, as inputs to generate each one of the plurality of subkey sets, a secret key and a different predetermined encoding value, and (ii) generates, as separate outputs of the key derivation function, individual subkeys of each subkey set from among the plurality of subkey sets,
    wherein each one of the predetermined encoding values used to generate each respective one of plurality of subkey sets is offset with respect to one another in accordance with a predetermined offset value; and
    a data interface configured to receive, for each one of a plurality of encoded data messages to be transmitted in accordance with a communication protocol, a number used only once (nonce) value, a portion of the nonce value comprising a per-message encoding value,
    wherein the processing circuitry is further configured to (i) generate each one of the plurality of encoded data messages using one of the stored plurality of subkey sets that was generated using one of the different predetermined encoding values that matches the per-message encoding value included in the nonce value identified with the one of the plurality of encoded data messages to be transmitted, and (ii) generate and store the plurality of subkey sets prior to the plurality of encoded data messages being generated.

2. The ECU of claim 1, wherein the processing circuitry is configured to generate the plurality of encoded data messages in accordance with an authenticated-encryption Galois/Counter Mode (AES-GCM)-SIV mode of operation or a ShangMi 4 (SM4) cipher.

3. The ECU of claim 1, wherein the communication protocol comprises one of a Controller Area Network (CAN) communication protocol, a Controller Area Network Flexible Data-Rate (CAN FD) communication protocol, a Controller Area Network Extra Long (CAN XL) communication protocol, or an Ethernet communication protocol.

4. The ECU of claim 1, wherein the plurality of subkey sets are stored in a cache at address locations identified by the predetermined encoding values used to generate each respective one of the plurality of subkey sets.

5. The ECU of claim 1, wherein the predetermined offset value comprises an offset generated in accordance with a predetermined function.

6. The ECU of claim 5, wherein the predetermined function comprises an offset generated via an incremented counter value.

7. The ECU of claim 1, wherein, for each one of the plurality of encoded data messages to be transmitted, the portion of the nonce value comprising the per-message encoding value comprises a freshness value.

8. The ECU of claim 7, wherein, for each one of the plurality of encoded data messages to be transmitted, a further portion of the nonce value comprises a secure channel indicator (SCI).

9. The ECU of claim 1, wherein the processing circuitry is further configured to delete the stored subkey set from the plurality of subkey sets upon using the subkey set to generate a corresponding encoded data message.

10. The ECU of claim 1, wherein the processing circuitry is further configured to generate and store a further plurality of subkey sets in accordance with a further key derivation function that utilizes, as inputs for each generated one of the further plurality of subkey sets, the secret key and a further predetermined encoding value.

11. The ECU of claim 10, wherein the processing circuitry is further configured to generate each one of the plurality of encoded data messages using one of the stored plurality of subkey sets or one of the stored further plurality of subkey sets based upon a secure zone identified with a destination of the encoded data message to be transmitted.

12. An electronic control unit (ECU) identified with a vehicle, the ECU comprising:
processing circuitry configured to generate and store a plurality of subkey sets in accordance with a key derivation function that (i) utilizes, as inputs to generate each one of the plurality of subkey sets, a secret key and a different predetermined encoding value, and (ii) generates, as separate outputs of the key derivation function, individual subkeys of each subkey set from among the plurality of subkey sets,
wherein each one of the predetermined encoding values used to generate each respective one of plurality of subkey sets is offset with respect to one another in accordance with a predetermined offset value; and
a data interface configured to receive, for each one of a plurality of encoded data messages to be received in accordance with a communication protocol, a number used only once (nonce) value, a portion of the nonce value comprising a per-message encoding value,
wherein the processing circuitry is further configured to (i) decode each one of the plurality of encoded data messages using one of the stored plurality of subkey sets that was generated using one of the different predetermined encoding values that matches the per-message encoding value included in the nonce value identified with the one of the plurality of encoded data messages that is received, and (ii) generate and store the plurality of subkey sets prior to the plurality of encoded data messages being received.

13. The ECU of claim 12, wherein the processing circuitry is configured to decode the plurality of encoded data messages in accordance with an authenticated-encryption Galois/Counter Mode (AES-GCM)-SIV mode of operation or a ShangMi 4 (SM4) cipher.

14. The ECU of claim 12, wherein the communication protocol comprises one of a Controller Area Network (CAN) communication protocol, a Controller Area Network Flexible Data-Rate (CAN FD) communication protocol, a Controller Area Network Extra Long (CAN XL) communication protocol, or an Ethernet communication protocol.

15. The ECU of claim 12, wherein the plurality of subkey sets are stored in a cache at address locations identified by the predetermined encoding values used to generate each respective one of the plurality of subkey sets.

16. The ECU of claim 12, wherein the predetermined offset value comprises an offset generated in accordance with a predetermined function.

17. The ECU of claim 16, wherein the predetermined function comprises an offset generated via an incremented counter value.

18. The ECU of claim 12, wherein, for each one of the plurality of encoded data messages that is received, the portion of the nonce value comprising the per-message encoding value comprises a freshness value.

19. The ECU of claim 18, wherein, for each one of the plurality of encoded data messages that is received, a further portion of the nonce value comprises a secure channel indicator (SCI).

20. The ECU of claim 12, wherein the processing circuitry is further configured to delete the stored subkey set from the plurality of subkey sets upon using the subkey set to generate a corresponding decoded data message.

21. The ECU of claim 12, wherein the processing circuitry is further configured to generate and store a further plurality of subkey sets in accordance with a further key derivation function that utilizes, as inputs for each generated one of the further plurality of subkey sets, the secret key and a further predetermined encoding value.

22. The ECU of claim 21, wherein the processing circuitry is further configured to generate each one of the plurality of decoded data messages using one of the stored plurality of subkey sets or one of the stored further plurality of subkey sets based upon a secure zone identified with a destination of the encoded data message that is received.

23. The ECU of claim 1, wherein each one of the plurality of subkey sets is associated with a respective one of the plurality of encoded data messages.

24. The ECU of claim 1, wherein the processing circuitry is configured to determine the predetermined offset prior to generating the plurality of encoded data messages and based upon a predetermined pattern with respect to a sequence in which the plurality of encoded data messages are generated.

* * * * *